United States Patent [19]

von Reckinghausen

[11] Patent Number: 4,615,222
[45] Date of Patent: Oct. 7, 1986

[54] GAS FLOW MONITOR USING A VORTEX GENERATOR

[75] Inventor: Daniel R. von Reckinghausen, Hudson, N.H.

[73] Assignee: American Electromedics Corp., Hudson, N.H.

[21] Appl. No.: 638,753

[22] Filed: Aug. 8, 1984

[51] Int. Cl.⁴ .............................................. G01F 1/20
[52] U.S. Cl. ................................................. 73/861.21
[58] Field of Search ........... 73/861.21, 861.18, 861.22, 73/189, 861.23

[56] References Cited

U.S. PATENT DOCUMENTS

| | | | |
|---|---|---|---|
| 2,492,371 | 12/1949 | Sivian | 73/861.49 |
| 2,813,424 | 12/1957 | Liepmann et al. | 73/861.24 X |
| 3,021,708 | 2/1962 | November et al. | 73/861.18 |
| 3,555,898 | 1/1971 | Paine | 73/861.21 |
| 3,719,073 | 3/1973 | Mahon | 73/861.22 |

*Primary Examiner*—Herbert Goldstein
*Attorney, Agent, or Firm*—Kane, Dalsimer, Kane, Sullivan and Kurucz

[57] ABSTRACT

A gas flow monitor has a T-shaped member adapted to conduct the gas flow of interest between its arms while a pressure transducer is disposed in its leg. A vortex or turbulence within the gas flow is generated within the T-shaped member to produce acoustic waves indicative of the magnitude and direction of the gas flow. The vortex is generated by providing a transversal rod in said T-shaped member, and by terminating one of the arms by an acoustic resonator.

11 Claims, 8 Drawing Figures

GAS FLOW MONITOR USING A VORTEX GENERATOR

BACKGROUND OF THE INVENTION

1. Field of Invention

The present invention relates to improvements in devices for measuring the presence or absence of flow of a gas above a predetermined threshold for flow in one direction with a differing threshold for flow in the opposite direction, the flow of such gas being confined between an inlet and outlet ports.

2. Description of the Prior Art

Customarily, gas flow in a pipe is measured as a pressure difference between an upstream location and a downstream location, a section of the pipe at an intermediate location containing either a resistance element to insure laminar gas flow therethrough or a defined discontinuity to insure a predetermined turbulent gas flow. Other useful methods involve the direct measurement of mass flow employing such devices as rotation vanes in a fixed location or spheres lifted in a tapered pipe. Still further methods involve the measurement of transit time of an acoustic signal along the direction of gas flow.

All of these methods have certain common disadvantages such as the complexity of apparatus required to perform the methods and their inability to combine sensitivity for low gas flows with low flow resistance, as well as their sensitivity to contamination by dirt or moisture. These disadvantages are overcome in the apparatus of the present invention.

OBJECTIVES AND SUMMARY OF THE INVENTION

In view of the above, an object of the present invention is to provide a relatively simple, yet accurate device for determining gas flow.

A further object is to provide a device which is not affected or contaminated by the gas being monitored.

Yet a further object is to provide a device capable of differentiating between the gas flow in one direction from flow in the opposite direction.

Other objects and advantages shall become apparent from the following description of the invention.

According to this invention, a device for monitoring gas flow comprises a pipe for conducting a gas in either direction, between two points, a pressure transducer for generating electrical signals corresponding to the gas flow instantaneous pressure at a location between said two points, and means disposed within said pipe for producing a vortex or turbulence which generates acoustic waves indicative of the speed and magnitude of said gas flow.

BRIEF DESCRIPTION OF THE DRAWINGS

The invention will now be described with reference to the following drawings.

DETAILED DESCRIPTION OF THE INVENTION

Figure 1:
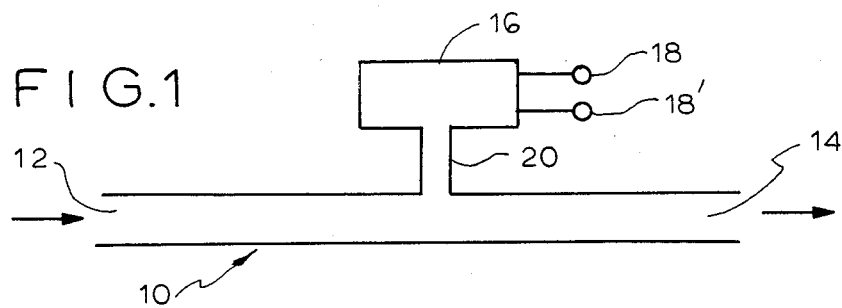
FIG. 1 of which is a cross-sectional representation of this invention in its simplest form.

In FIG. 1 a gas flow exists in pipe 10 when it is connected to a source of gas at inlet 12 and exiting to a sink or outlet at 14, the direction of flow shown by arrows for purposes of illustration only. An electro-pneumatic transducer 16, having electrical output terminals 18 and 18' is connected to pipe 10 via a sampling tube 20.

If the sink 14 is terminated at ambient pressure and gas flow is in the direction of the arrows, transducer 16 measures an average pressure higher than ambient pressure, the differing amount being equal to the product of volume flow of gas through pipe 10 multiplied by the effective flow resistance of the pipe between the location of sampling tube 20 and outlet 14.

As long as gas flow is purely laminar without any turbulence, the effective flow resistance remains constant. This flow resistance is increased by end effects which exist at inlet 12 and outlet 14 thus increasing the effective length of the tube. Under these conditions the electrical output signal of transducer 16 is expected to contain essentially only a D.C. component contaminated only by incidental background electrical noise or acoustic noise generated by external sources and transformed into an electrical noise signal by transducer 16. The D.C. electrical signal is proportional to the direct gas flow.

If tube 10 were smooth and circular, gas flow would remain essentially laminar until a Reynolds number of 2000 (in Mks values) were exceeded, after which the above-mentioned average pressure difference increases proportional to the square of flow velocity. This is only one indication of turbulent flow of a gas.

When the gas flow exceeds the Reynolds number the electrical output signal transducer 10 would not only contain the D.C. component due to average pressure, but also an A.C. component directly proportional to the instantaneous pressure variations at the junction of pipe 10 and sampling tube 20 as filtered by the acoustic properties of the gas in tube 20 terminated by the acoustic impedance of transducer 16, said acoustic properties and impedance forming a low-pass filter having at least one response peak in the vicinity of its low-pass cut-off frequency. A further modification of the A.C. component occurs due to the acoustic and electrical properties of transducer 16 resulting in a steady pressure and an alternating signal caused by instantaneous pressure variations.

Surprisingly, when the device of FIG. 1 was constructed it was found that the electrical output of transducer 16 had an A.C. component even when the flow was below the Reynolds number (i.e. when the flow was nominally laminar). The alternating signal was found to be almost noise-like in quality with a relatively constant spectrum level as function of frequency and varying in amplitude nearly proportional to the square of the gas flow velocity, at flows above and below the critical Reynolds number cited above.

The existence of a substantial alternating signal below said critical Reynolds number was unanticipated, since the reference texts teach only a linear relationship between flow and pressure. Consequenty, it was endeavored to increase the ratio of the amplitudes of the A.C.

to D.C. signal to see if direction of flow could be sensed by trying to increase the turbulence in the pipe.

Figure 2:
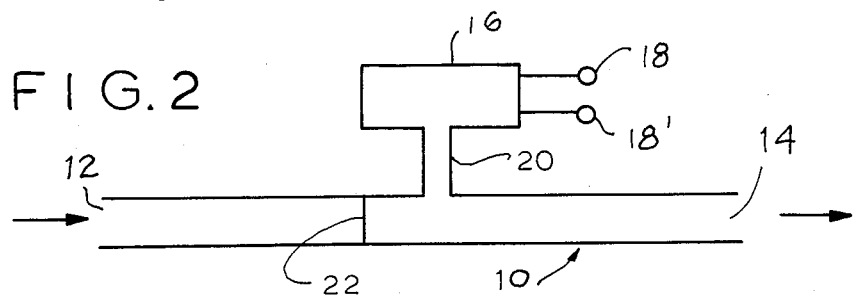
FIGS. 2-5 of which show various configurations of increasing complexity for the vortex generator.

As shown in FIG. 2, the addition of a transverse rod 22 located upstream from sampling tube 20 was found to create turbulence in the gas flow which increases the amplitude of the A.C. signal. For best results, rod 22 is preferably located at a distance approximately equal the diameter of pipe 10 upstream from, and parallel to sampling tube 20. Rod 22 need not be circular in cross-section, but should have a major diameter transversal to pipe 10 equal to between 3% and 12% of the interior diameter of pipe 10 and be located near the axis of pipe 10 which should remain unobstructed.

Figure 3:
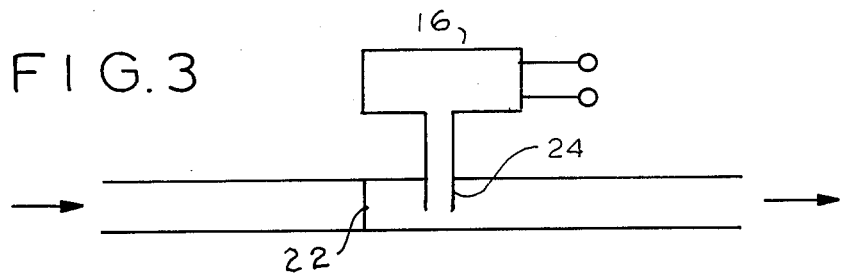

A further increase in the ratio of A.C. to D.C. signal can be achieved by sampling the gas flow near the axis of pipe 10 rather than its side. In FIG. 3, sampling tube 20 has an extension 24 added, which for highest sensitivity should extend somewhat beyond the axis of pipe 10.

A still further increase in said ratio can be obtained by forcing the existing stream of gas to leave pipe 10 in a nearly radial direction and to cause pulsations in this stream by placing a closed-end pipe 24 (see FIG. 4) having the same diameter as pipe 10 with a circumferential gap 26 having a width of approximately one-half diameter of pipe 1. In essence, closed end pipe 24 acts as a resonator. The length of resonator 24 should be equal to at least two diameters of pipe 10, but preferably no longer than one-half wavelength of sound in the gas used as the highest frequency of interest.

Figure 4:
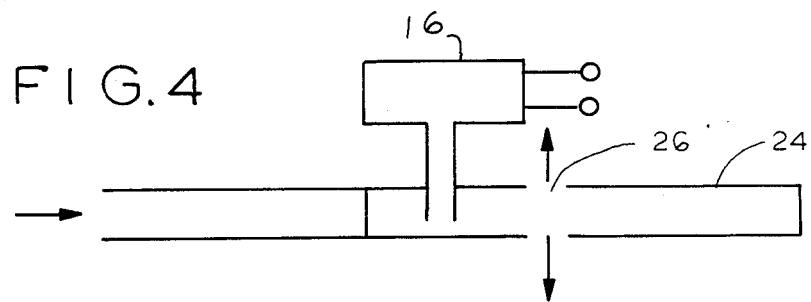

It may be appreciated that the exiting gas stream leaves pipe 10 in a radial direction in FIG. 4 and is thus no longer constrained.

Figure 5:
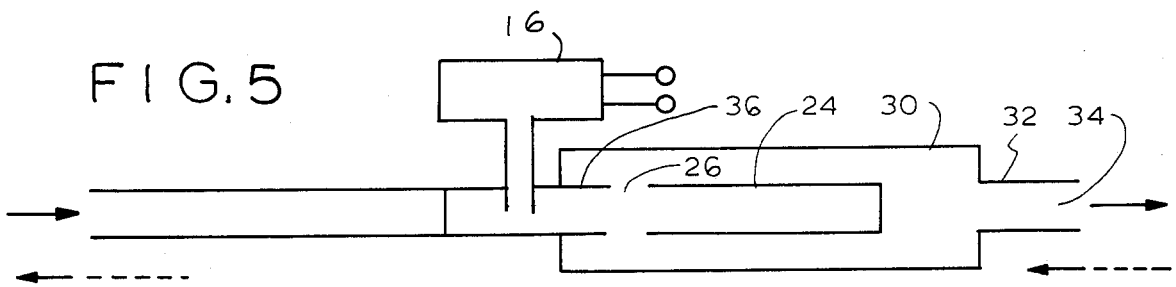

In FIG. 5, this gas stream at gap 26 is captured in a larger pipe 30, having an exit pipe 32 through which the gas exits at 34. To prevent smoothing of the now turbulent gas stream at gap 26 larger pipe 30 is attached to pipe 10 as shown leaving a portion 36 of pipe 10 projecting in pipe 30 as shown. The length of portion 36 should be at least as long as the width of gap 26.

Figure 6:
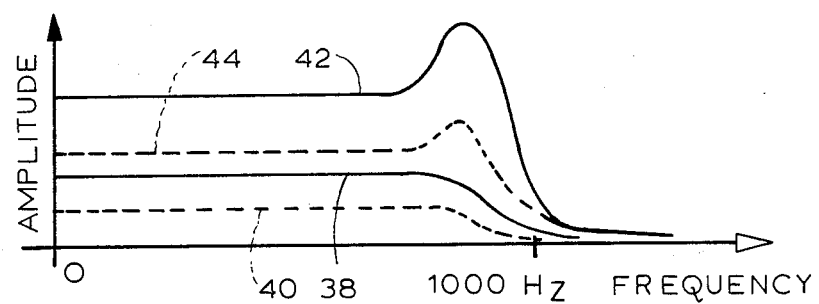
FIG. 6 of which shows the spectral level of sound received by the transducer.

FIG. 6 shows the spectrum level of the electrical output signal of transducer 16 as a function of frequency. If gas flow in the apparatus of FIG. 5 is low and in the direction of the solid arrows, curve 38 results which shows a relatively constant spectrum level up to the upper frequency limit near 1000 Hz. If the flow of gas remains the same, but in the opposite direction (indicated by dashed arrows in FIG. 4) a reduced spectrum level 40 results. For somewhat higher flows the respective curves 42 and 44 result and the peak near the cutoff frequency is evident.

Figure 7:
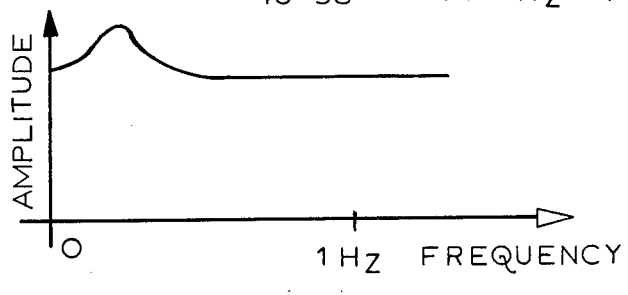
FIG. 7 of which shows the spectral level of low-frequency sound generated by a gas stream which periodically reverses its direction as received by the transducer.

If the gas flow through the illustrated apparatus is cyclically slowly reversed, the spectrum level curves of FIG. 6 follow the sequence defined by curve 38 followed by 42 then followed by 38, 40, 44, 40 and back to 38. In addition to this cycle, transducer 16 also produces a low frequency output shown in FIG. 7 at the frequency of the flow reversal. Clearly, after calibration, monitoring the output of transducer 16 results in an indication of the magnitude and direction of flow of gas through pipe 10.

Figure 8:
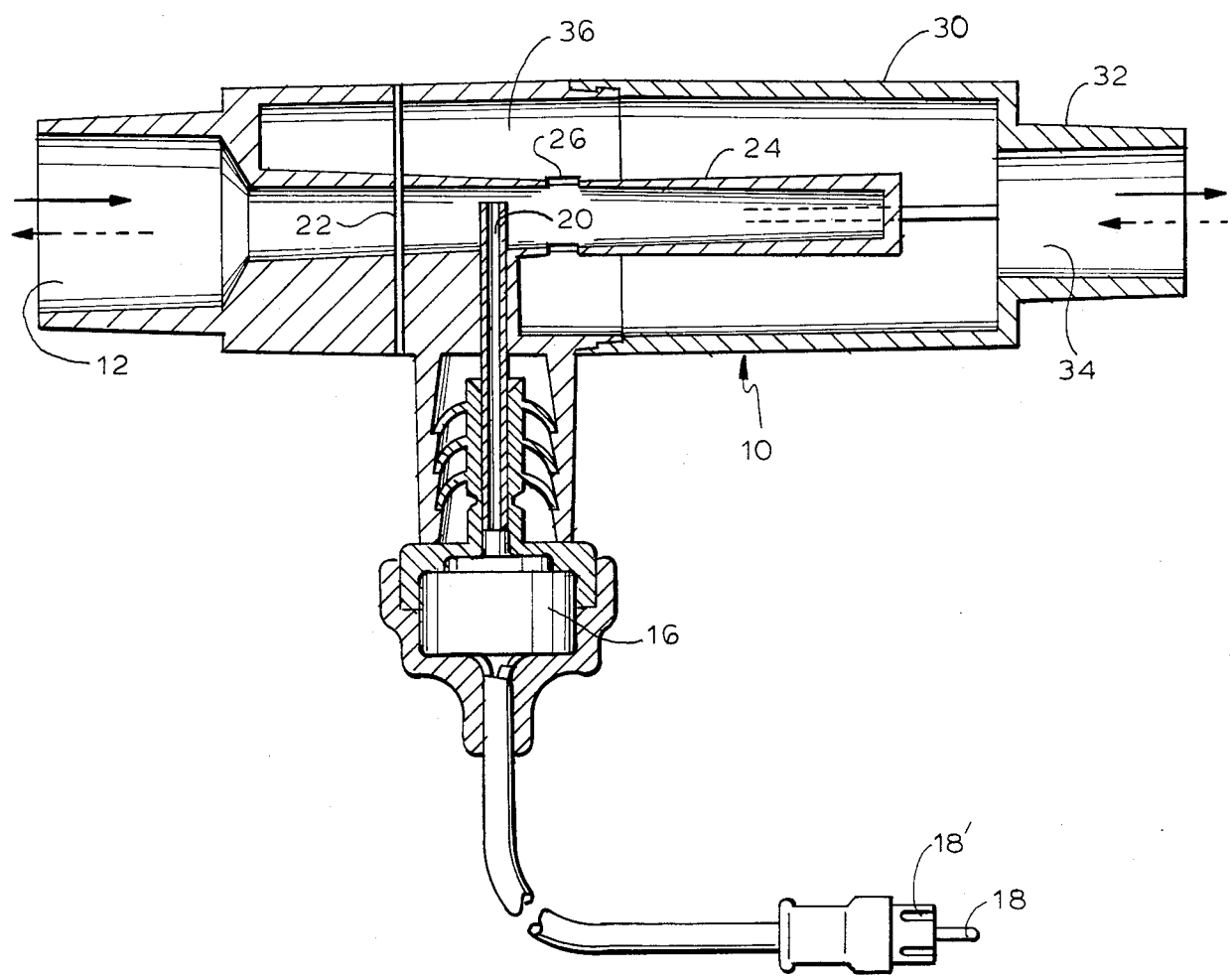
FIG. 8 of which shows a preferred embodiment of the present invention.

FIG. 8 shows a preferred embodiment of the cross-section of an actual device incorporating the features of the somewhat diagramatic representation shown in FIG. 5. The device may be made by well known techniques such as plastic molding. In order to monitor gas flow, the device is connected so that pipe 12 is in-line with the gas flow of interest.

In the preferred embodiment, the transducer 16 may be an electret condenser microphone with an integral amplifier containing a field-effect transistor, such as model EM-80 manufactured by the Primo Corporation. The gas flow monitor 10 may have an overall length of 4 inches, with the inlet section and the resonator having an inside diameter of approximately $\frac{1}{4}$ inch. A gas flow of as little as 40 ml/sec. from the inlet section may reliably be detected as an acoustic noise having a sound pressure level of 75 dB with reference to 0.0002 dynes/cm$^2$ at the face of the microphone.

Further modifications of this apparatus may be made by those skilled in the art and all such modifications are deemed to fall within the scope of claims appended herewith.

Having thus described my invention, I claim:

1. An apparatus for monitoring a gas flow comprising:
   a pipe with sidewalls for conducting gas between a first and a second end, said second end having a circumferential gap for allowing radial gas flow; and an acoustic resonator disposed around said circumferential gap and comprising an axial extension directed away from said first end;
   a straight rod extending between said sidewalls and disposed transversely within said tube for generating turbulence within said gas flow for generating acoustic waves indicative of said gas flow;
   transducer means for generating electric signals corresponding to said acoustic wave; and
   a tube having an open end disposed within said pipe, said tube being provided to transmit said acoustic waves to said transducer means.

2. The apparatus of claim 1 wherein said rod is oriented in parallel with said tube.

3. The apparatus of claim 1 wherein said tube extends into said pipe with said open end being disposed adjacent to said pipe axis.

4. The apparatus of claim 1 wherein said second end further comprises another pipe coaxial with said first pipe and constructed and arranged to surround said gap.

5. The apparatus of claim 4 wherein said second pipe is terminated at a point disposed between said gap and said tube.

6. An apparatus for monitoring a gas flow comprising:
   a pipe having a first end which is open, a closed acoustic resonator end, and a circumferential gap adapted to conduct said gas flow to and from said first end;
   a tube having an open end and a closed end, and extending transversally into said pipe between said first end and said gap;
   monitoring means disposed at said closed end and adapted to generate electrical signals corresponding to the gas flow pressure at said tube open end; and
   a transversal rod disposed in said pipe between said first pipe end and said open tube end whereby acoustic waves are generated indicative of the magnitude and direction of said gas flow.

7. The apparatus of claim 6 wherein said rod is offset from the pipe axis.

8. The apparatus of claim 6 wherein said rod has a maximum thickness of 3–12% of the pipe diameter.

9. The apparatus of claim 6 wherein the rod is placed at a distance equal to the diameter of the pipe from said open tube end.

10. The apparatus of claim 6 wherein said closed pipe end has a length equal to twice the pipe diameter.

11. The apparatus of claim 6 wherein said gap has a width equal to one half the pipe diameter.

* * * * *